(12) United States Patent
Frejd

(10) Patent No.: US 7,338,237 B2
(45) Date of Patent: Mar. 4, 2008

(54) DRILL AND DRILL TIP FOR CHIP REMOVING MACHINING

(75) Inventor: Stefan Frejd, Soderkoping (SE)

(73) Assignee: Seco Tools AB, Fagersta (SE)

( * ) Notice: Subject to any disclaimer, the term of this patent is extended or adjusted under 35 U.S.C. 154(b) by 22 days.

(21) Appl. No.: 10/908,130

(22) Filed: Apr. 28, 2005

(65) Prior Publication Data

US 2005/0249562 A1 Nov. 10, 2005

(30) Foreign Application Priority Data

May 5, 2004 (SE) .................................... 0401175

(51) Int. Cl.
*B23B 51/02* (2006.01)
(52) U.S. Cl. ...................... 408/230; 408/713
(58) Field of Classification Search ................ 408/144, 408/226, 227, 229, 230, 713, 231, 233; B23B 51/00, B23B 51/02
See application file for complete search history.

(56) References Cited

U.S. PATENT DOCUMENTS

| | | | | |
|---|---|---|---|---|
| 1,461,548 | A | * | 7/1923 | West ............................ 279/87 |
| 3,994,615 | A | * | 11/1976 | Narang ........................ 408/226 |
| 4,561,813 | A | * | 12/1985 | Schneider .................... 408/230 |
| 4,759,667 | A | * | 7/1988 | Brown ......................... 408/230 |
| 4,768,901 | A | | 9/1988 | Reinauer et al. |
| 5,387,059 | A | * | 2/1995 | Borzemsky ................. 408/226 |
| 5,486,075 | A | | 1/1996 | Nakamura et al. |
| 5,947,660 | A | | 9/1999 | Karlsson et al. |
| 5,967,712 | A | * | 10/1999 | Magill et al. ................ 408/227 |
| 5,988,953 | A | | 11/1999 | Berglund et al. |
| 6,146,060 | A | | 11/2000 | Rydberg et al. |
| 6,524,034 | B2 | * | 2/2003 | Eng et al. ...................... 408/59 |
| 2003/0017015 | A1 | * | 1/2003 | Strubler ....................... 408/230 |

FOREIGN PATENT DOCUMENTS

| | | | |
|---|---|---|---|
| EP | 0427857 | A1 | 5/1991 |
| EP | 0427857 | B1 | 10/1994 |
| JP | 55150905 | A * | 11/1980 |
| JP | 56134112 | A * | 10/1981 |
| JP | 04-244308 | | 9/1992 |
| JP | 05057517 | A * | 3/1993 |
| JP | 06344211 | A * | 12/1994 |
| JP | 08155713 | | * 6/1996 |
| JP | 11333611 | A | 12/1999 |
| JP | 2003136317 | A | 5/2003 |

OTHER PUBLICATIONS

PTO translation of JP 4-244308, by Stephen M. Spar, Dec. 7, 2007.*
International Search Report from corresponding PCT/SE2005/000592.

* cited by examiner

*Primary Examiner*—Daniel W. Howell
(74) *Attorney, Agent, or Firm*—WRB-IP LLP

(57) ABSTRACT

The present invention relates to a drill and a drill tip for chip removing machining. The drill has a drill body, a drill tip and a shank portion. The drill tip comprises at least one cutting edge and at least one peripherally arranged guide member. The drill has a center axis. The guide member of the drill tip comprises a part-cylindrical first surface portion and an eccentric second surface portion. The first surface portion connects axially rearwardly along the guide member to the second surface portion.

20 Claims, 6 Drawing Sheets

DRILL AND DRILL TIP FOR CHIP REMOVING MACHINING

The present invention relates to a drill and a drill tip for chip removing machining.

Through U.S. Pat. No. 5,947,660 a drill with a releasable drill tip anchored to a drill body by means of a pull rod is previously known. In itself the known drill renders a very good hole tolerance when the drill rotates. However, the known drill is not suitable in stationary applications as in boring where the known drill may jam in the drilled hole in the case of angular errors being present in the machine or in the chucking. Another drill is shown in U.S. Pat. No. 5,486,075, where the risk for the drill to seize in the hole is apparent.

It is desirable to provide a design of a drill, whereby said design eliminates the problems of prior art.

It is desirable to provide a drill with good guidance regardless of whether the drill rotates or not.

It is desirable to provide a drill, rendering low boring torque.

It is desirable to provide a drill adapted for a number of working materials.

DETAILED DESCRIPTION

Figure 2A:
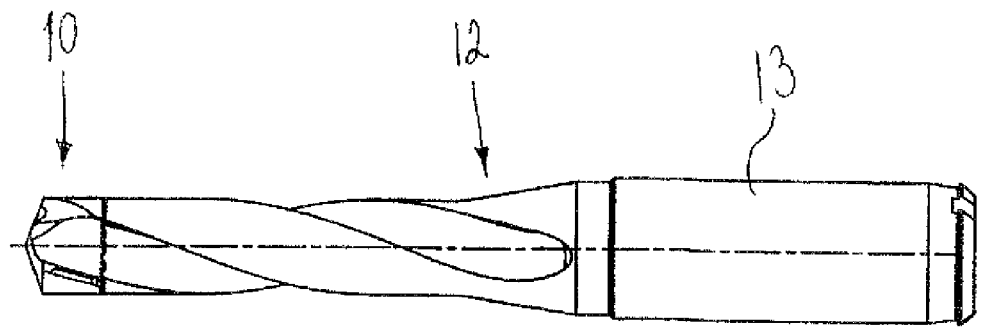
FIGS. 2A and 2B show a drilling tool according to the present invention and a portion of the drill tip in magnification, respectively, in a side view.
Figure 2B:
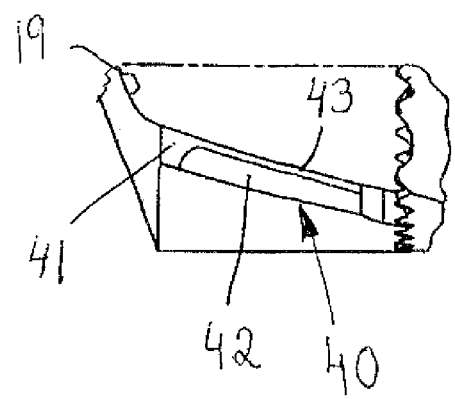

The embodiment of a drill according to the invention and shown in FIG. 2 is a so called helix drill, which in this case comprises a drill tip 10 or a forward end in the feed direction, a pull rod arrangement not shown, a drill body 12 and a shank 13. A portion of the drill tip is shown in magnification. With this tool it is possible to release and replace the drill tip although the drill body is fixed in the machine. The drilling tool has also been described in U.S. Pat. No. 5,947,660.

The drill body is provided with chip flutes 18A, extending along the lands of the drill along a helical path at a substantially constant distance from the center axis CL. The chip flutes can extend along the entire body or along a part thereof.

The drill body 12 at its end facing the drill tip 10 is provided with a front surface against which a support surface 16 of the drill tip 10 is provided to abut. The greatest diameter of the front surface is smaller than the greatest diameter of the drill tip but preferably the same as the smallest diameter of the drill tip. The drill body preferably has flush channels. The drill body 12 can be made of steel, cemented carbide or high speed steel. One of the free ends or shank portions of the drill body 12 is intended to be fastened to a rotatable spindle (not shown) in a drill machine while the opposite second free end comprises a front surface and a fastening hole, not shown. The free end of the pull rod is provided to project through the fastening hole. The front surface has a circular basic shape and comprises two groove portions. Each groove portion covers substantially half the front surface and comprises a number of identical grooves or slots spaced from each other. A second groove portion is delimited by a first groove portion. Substantially each slot in the first groove portion intersects the envelope surface of the drill body at two places while substantially each slot in the second groove portion intersects the envelope surface of the drill body at one place.

Figure 1A:
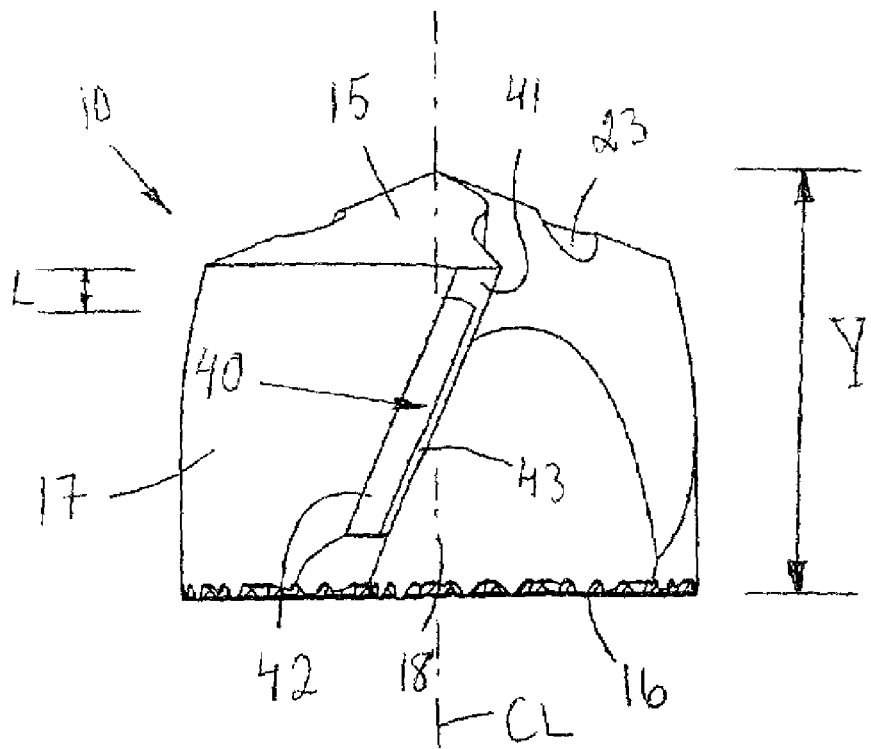
FIG. 1A shows a drill tip according to the present invention in a side view.
Figure 1B:
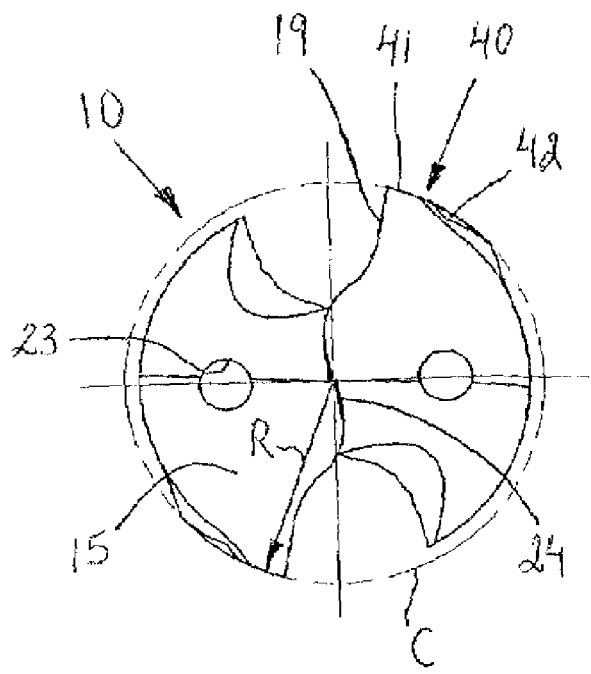
FIG. 1B shows the drill tip in a top view.
Figure 1C:
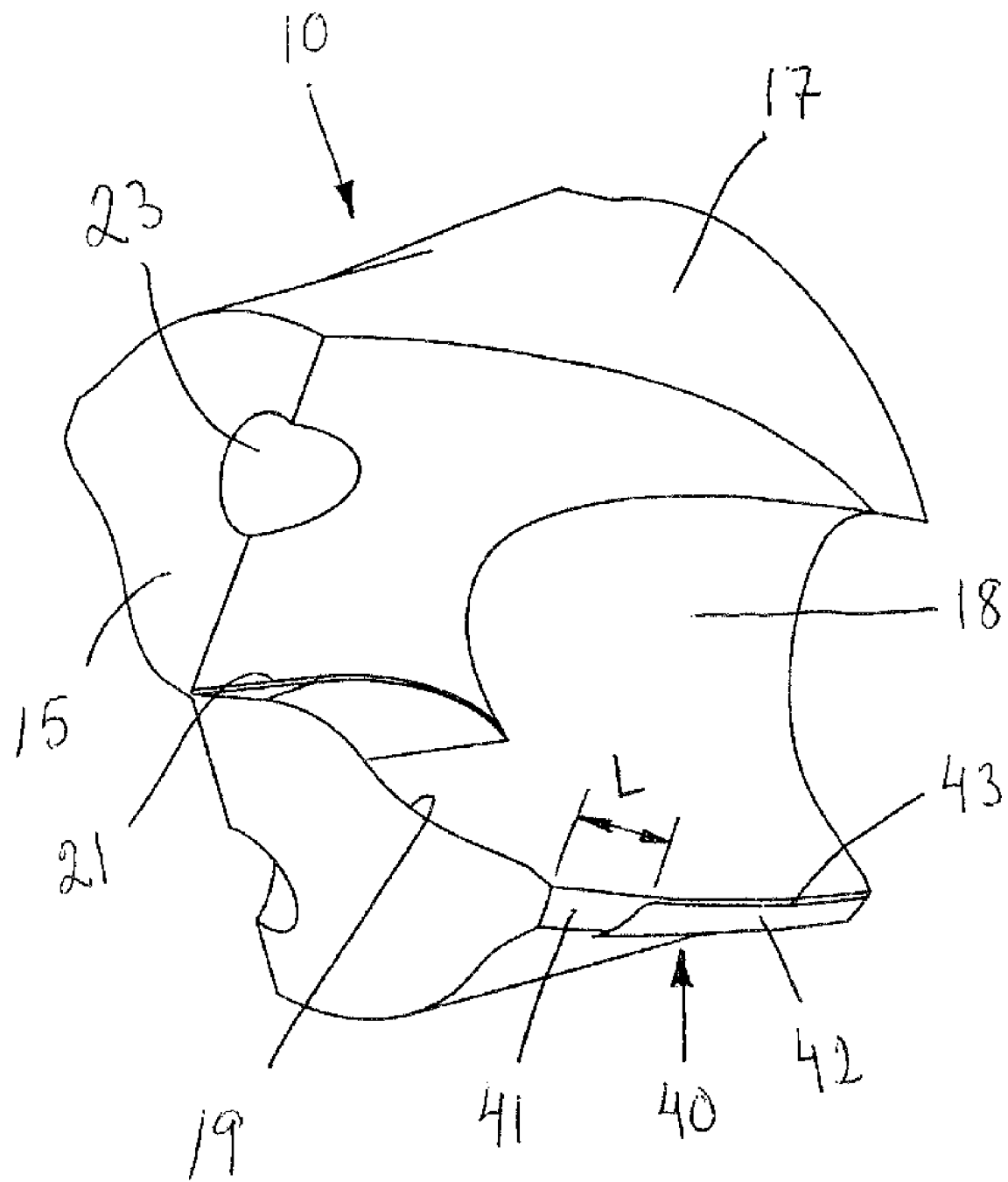
FIG. 1C shows the drill tip in a perspective view.

The drill tip 10, see especially FIGS. 1A-1D, is provided with at least one cutting edge at its end facing the drill body 12, and may be given a different design depending on the working material. The drill tip 10 has an edge 19 for drilling including a chisel edge 24. The drill tip 10 is made in hard material, preferably cemented carbide and most preferably in injection molded cemented carbide and comprises two upper clearance surfaces 15, a support surface 16 and them uniting first 17 and second 18 curved surfaces. All these surfaces and appending edges are made in the same material, which is preferably in injection molded cemented carbide. Lines of intersection between the second curved surfaces or the chip flutes 18 and the clearance surfaces 15 form the main cutting edges 19, preferably via, strengthening chamfers, not shown. The first curved surfaces 17 are provided radially inside the greatest diameter D of the drill tip and may have part-cylindrical shape. A margin or guide member 40 is provided at each leading end of the first curved surface 17, in the direction of rotation (that is when the drill tip according to FIG. 1B is rotated counter-clockwise). Lines of intersection between guides 40 and the chip flutes 18 form secondary cutting edges 20.

Each guide member 40 consists of at least two surface portions 41 and 42. The first surface portion 41 situated closest to the cutting edge 19 has a circumferential extension that coincides with an imaginary cylinder C, which is concentric with the center axis CL, whereby the first surface portion 41 can be said to constitute a part-cylindrical guide member. The surface portion 41 is defined by a radius R, the radial center of which is provided on the center axis CL. The surface portion 41 consequently has no clearance angle with respect to the drilled hole, not shown. The axial extension or length L of the surface portion 41 is 0.1 to 0.5 times the diameter D. The first surface portion 41 connects axially rearwardly along the guide member to the second surface portion 42, which has, in relation to the center axis CL, an eccentrical shape and thereby forms a greater clearance angle with respect to the wall of the hole than the surface portion 41, whereby the second surface portion 42 can be said to constitute an eccentrical guide member. Each eccentrical guide member 42 shown in the embodiment is cylindrical with a radial center provided spaced from the center axis CL. The eccentrical guide member 42 can alternatively have a different shape, such as planar or curved. Although it is an advantage for the tool life of the guide member if the surface portion 42 supports the surface portion 41, it is conceivable that the surface portion 42 is concentric with the center axis CL but has a radius smaller than the radius of the surface portion 41.

The first surface portion 41 is shorter in the axial direction than the second surface portion 42, preferably less than half, most preferably 0.1 to 0.5 times the axial length of the second surface portion 42.

Figure 1D:
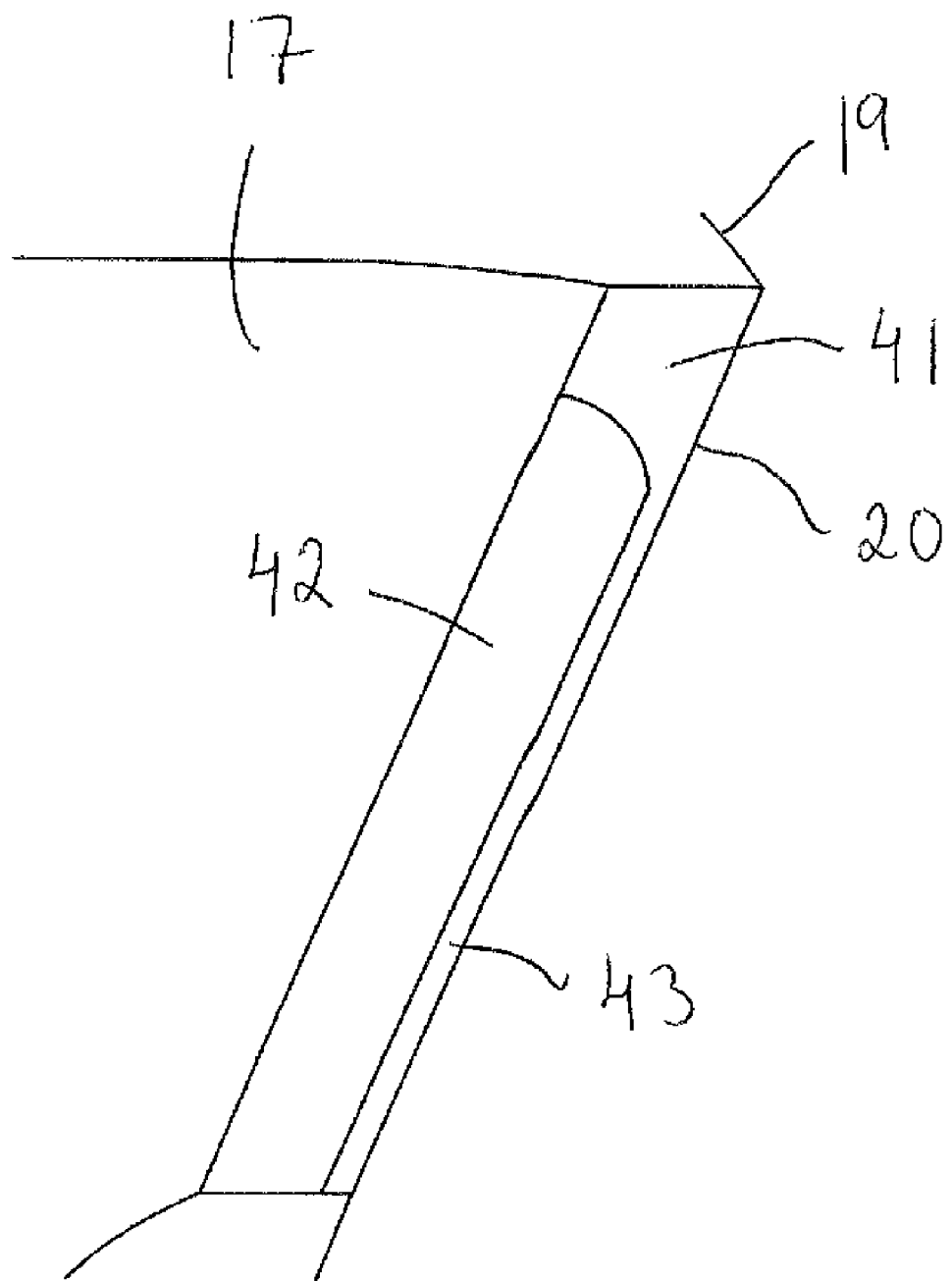
FIG. 1D shows a magnification of the drill tip in FIG. 1C.

As it appears foremost from FIG. 1D a third surface portion 43 could be provided in front of the second surface portion in the direction of rotation. The third surface portion 43 has a circumferential extension that coincides with the first surface portion 41 and thereby with the imaginary cylinder C. The third surface portion 43 has the same axial extension as the second surface portion 42 but is narrower in tangential direction.

The guide members 40 of the drill tip are consequently both part-cylindrical and eccentrical. A part-cylindrical guide member has the advantage of rendering a very good hole tolerance and fits best with rotary tools. An eccentrical guide member works excellently in stationary applications. With this geometry is avoided that the drill tip seizes in the self-drilled hole due to angular errors in the machine or in the chucking at stationary application such as in a lathe. In addition, good hole tolerance is obtained in the drilled hole and better support for centering at the entrance into the work piece, resulting in better roundness of the hole as compared to entirely eccentrical guide members. Furthermore, the corners are less worn due to the better centering. With a correctly combined variant of both types while designing the guide member, a guide member utilizing the advantages of both will be obtained, without obtaining any influence of their drawbacks. The part-cylindrical portion shall be provided closest to the cutting edge, with a length rendering a great support during drilling, but not so long that it renders a seizing effect for angular displacements between the work piece and the tool. Thereby a drill is obtained that is more universal and which renders the best possible precision in all types of applications.

The guide member can alternatively be adapted for a drill body with straight chip flutes. The drill tip preferably comprises also a coring-out surface 21 that reaches the center of the drill tip and which forms an angle with the central axis or axis of rotation CL of the tool. The angle lies within the interval 40 to 50°, preferably around 45°. The largest diameter of the drill tip constitutes the diametral distance D between the radially outermost points of the guide members 40. The height Y of the drill tip is substantially equal to the diameter D, in order to minimize the wear from chips on the joint between the drill tip and the drill body. The greatest diameter of the support surface 16 is preferably less than diameter D, in order to obtain clearance during machining. Flushing holes 23, substantially parallel to the rotational axis CL, can run through the drill tip from the support surface 16 to the orifice in respective upper clearance surface 15. The flushing holes are preferably provided on a line, on each side of the center axis CL.

The drill consequently comprises a drill body 12, a drill tip 10 and a means for fastening 11, wherein the drill body has a front surface 14 and the drill tip has a support surface 16 arranged to releasably abut against each other. The drill body has a shank portion. The drill tip consists of cemented carbide and comprises at least one cutting edge 19 and a central hole or protrusion, not shown, cooperating with the means for fastening. The hole/protrusion and the cutting edge are integrated with the drill tip 10. The drill tip comprises guide members 40. The drill tip has a center axis CL. The guide members 40 of the drill tip 10 comprise both part-cylindrical first surface portions 41 and eccentrical second surface portions 42. A first surface portion 41 situated closest to the cutting edge 19 has a circumferential extension that coincides with an imaginary cylinder C, which is concentric with the center axis CL. The first surface portion 41 connects axially rearwardly to a second surface portion 42, which has, in relation to the center axis CL, an eccentrical shape. The first surface portion 41 lacks clearance angle with respect to the drilled hole and in that the second surface portion 42 forms a clearance angle with respect to the wall of the hole. The first surface portion 41 is shorter in the axial direction than the second surface portion 42, preferably less than half, most preferably 0.1 to 0.5 times the axial length of the second surface portion 42. The drill tip 10 has a circular basic shape as well as at least one cutting edge 19, which is integrated with the drill tip 10, which at its end facing away from the cutting edge is provided with a support surface 16. The drill tip consists of cemented carbide and comprises a central hole or protrusion, not shown, to cooperate with a means for fastening. The hole/protrusion and the cutting edge are integrated with the drill tip. The drill tip comprises guide members 40. The drill tip has a center axis CL. The guide members 40 of the drill tip 10 comprise both part-cylindrical first surface portions 41 and eccentrical second surface portions 42.

The drill tip 10 and the drill body 12 may comprise support 16 and front surfaces, respectively, in accordance with U.S. Pat. No. 6,146,060.

Likewise, it is possible to utilize other means for fastening than a central pull rod; for example it is possible to hold the drill tip by means of a bayonet coupling such as indicated in U.S. Pat. No. 5,988,953.

Figure 3A:
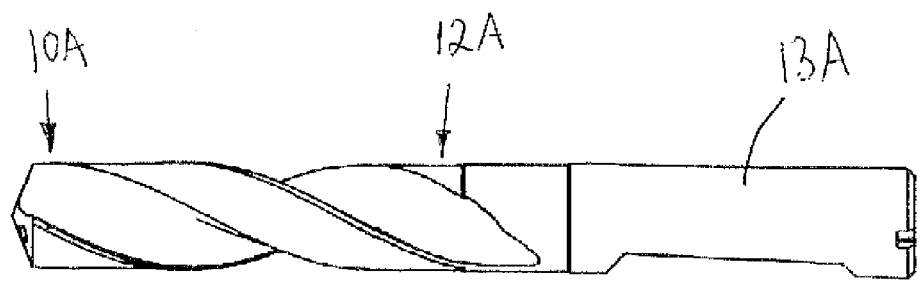
FIGS. 3A and 3B show an alternative embodiment of a drilling tool according to the present invention and a portion of the drill tip in magnification, respectively, in a side view.
Figure 3B:
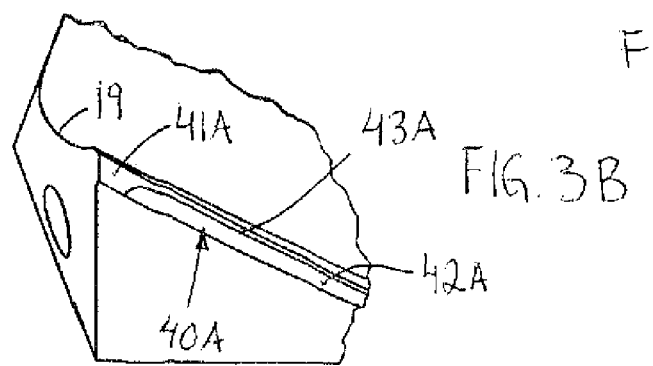

In FIG. 3A an alternative embodiment of a drilling tool according to the present invention is shown. A portion of the drill tip is shown in magnification in FIG. 3B. The drilling tool is a solid helix drill, which comprises a drill tip 10A, a drill body 12A as well as a shank 13A. The drill tip 10A comprises guide members 40A, which as mentioned above comprises both part-cylindrical first surface portions 41A and eccentrical second surface portions 42A. The axial extension or length L of the surface portion 41A is 0.1 to 0.5 times the diameter D. A third surface portion 43A may be provided in front of the second surface portion in the direction of rotation. The third surface portion 43A has a circumferential extension coinciding with the first surface portion 41A and thereby with the imaginary cylinder C. Also in other respects the guide members 40A substantially have the same design as the guide members 40.

Figure 4A:
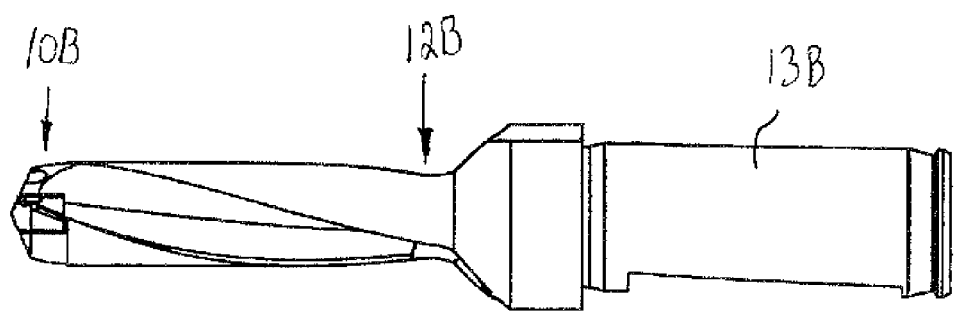
FIGS. 4A and 4B show an additional alternative embodiment of a drilling tool according to the present invention and a portion of the drill tip in magnification, respectively, in a side view.
Figure 4B:
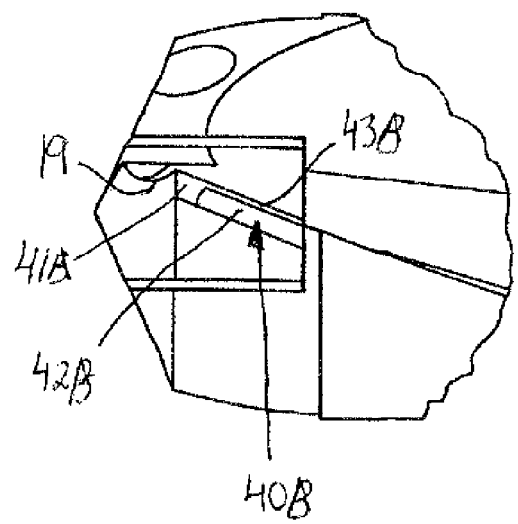

In FIG. 4A another alternative embodiment of a drilling tool according to the present invention is shown. A portion of the drill tip is shown in magnification in FIG. 4B. The drilling tool is a helix drill with brazed cemented carbide cutting inserts. The drill comprises a drill tip 10B, a drill body 12B as well as a shank 13B. The drill tip 10B comprises guide members 40B, which as mentioned above comprises both part-cylindrical first surface portions 41B and eccentrical second surface portions 42B. The axial extension or length L of the surface portion 41B is 0.1 to 0.5 times the diameter D. A third surface portion 43A may be provided in front of the second surface portion in the direction of rotation. The third surface portion 43B has a circumferential extension coinciding with the first surface portion 41B and thereby with the imaginary cylinder C. Also in other respects the guide members 40B substantially have the same design as the guide members 40.

Figure 5A:
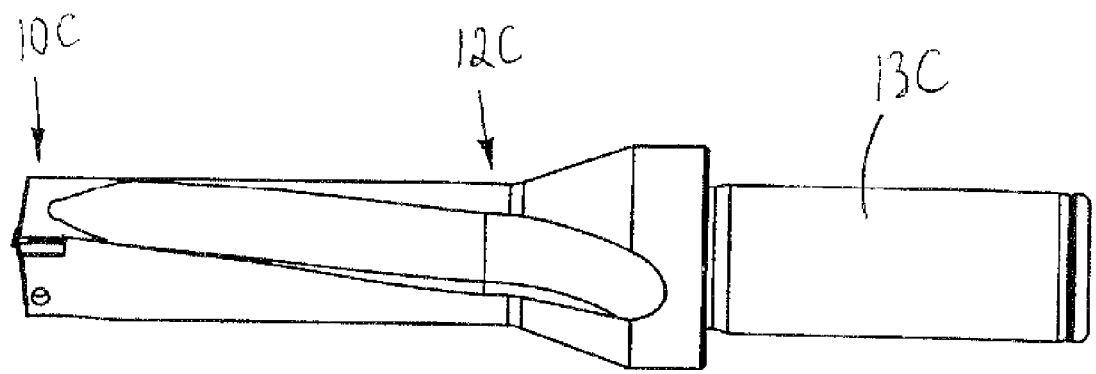
FIGS. 5A and 5B show an additional alternative embodiment of a drilling tool according to the present invention and a portion of the drill tip in magnification, respectively, in a side view.
Figure 5B:
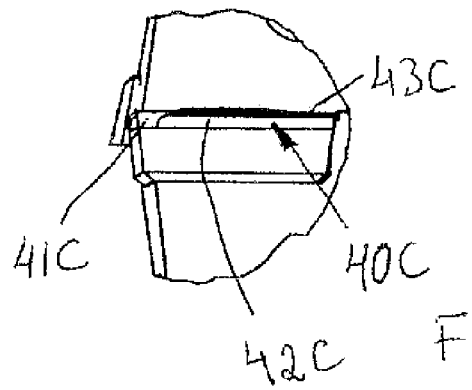
Figure 5C:
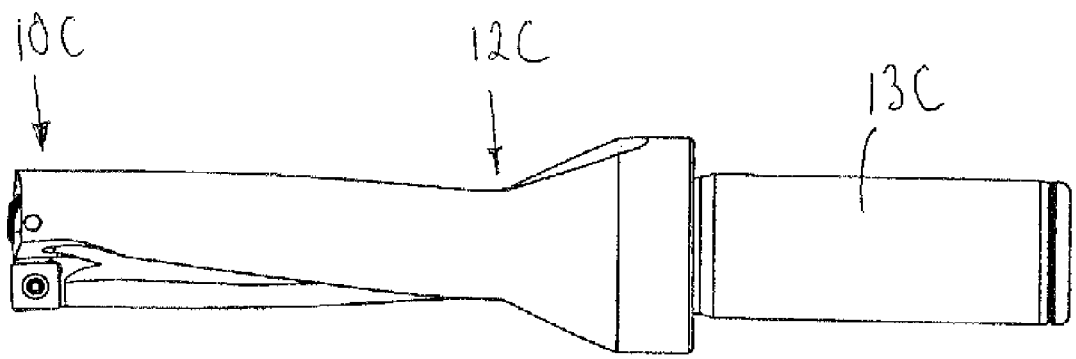
FIG. 5C shows the drilling tool in FIG. 5A in a side view rotated approximately 90°.

In FIGS. 5A-5C still another alternative embodiment of a drilling tool according to the present invention is shown. A portion of the drill tip is shown in magnification in FIG. 5B. The drilling tool is a drill with screwed cemented carbide cutting inserts, having a central insert and a peripheral insert, wherein both are indexable inserts. The central insert is in this embodiment not identical with the peripheral insert. The central insert has different clearance and different shape regarding the edges of the cutting insert. The drill comprises a drill tip 10C, a drill body 12C as well as a shank 13C. The drill tip 10C comprises at least one guide member 40C provided on the peripheral insert, which guide member as mentioned above comprises both part-cylindrical first surface portions 41C and eccentrical second surface portions 42C. The axial extension or length L of the surface portion 41C is 0.1 to 0.5 times the diameter D. A third surface portion 43C may be provided in front of the second surface portion in the direction of rotation. The third surface portion 43C has a circumferential extension coinciding with the first surface portion 41C and thereby with the imaginary cylinder C. Also in other respects the guide members 40C substantially have the same design as the guide members 40.

In all the shown embodiments of a drill according to the present invention the first surface portion 41-41C connects axially rearwardly along the guide member 40-40C to the second surface portion 42-42C, thereby comprising in fact all drills regardless of the axial inclination of the guide members.

The invention is in no way limited to the above described embodiments and may be freely varied within the limits of the subsequent claims. The drill tip is preferably coated with layer of e.g. $Al_2O_3$, TiN and/or TiCN. In certain cases it may be well-founded with brazed-on super hard materials such as CBN or PCD on the cutting edges and/or the guide members.

The disclosures in Swedish patent application No. 0401175-5, from which this application claims priority, are incorporated herein by reference.

Although the present invention has been described in connection with preferred embodiments thereof, it will be appreciated by those skilled in the art that additions, deletions, modifications, and substitutions not specifically described may be made without departing from the scope of the invention as defined in the appended claims.

What is claimed is:

1. A drill for, with respect to a work piece, rotary chip removing machining, comprising a drill body, a drill tip, and a shank portion, the drill tip comprising at least one cutting edge and at least one peripherally arranged guide member, the drill having a center axis, the guide member comprising a part-cylindrical first surface portion, an eccentric second surface portion, and a part-cylindrical third surface portion, the first surface portion connecting axially rearwardly along the guide member to the second surface portion and the third surface portion connecting forwardly to the second surface portion in a direction of rotation of the drill tip, the drill tip being adapted to be removably secured to the drill body.

2. The drill according to claim 1, wherein a first surface portion situated closest to the cutting edge has a circumferential extension coinciding with an imaginary cylinder, which is concentric with the center axis.

3. The drill according to claim 2, wherein the second surface portion is eccentric relative to the center axis.

4. A drill for, with respect to a work piece, rotary chip removing machining, comprising a drill body, a drill tip, and a shank portion, the drill tip comprising at least one cutting edge and at least one peripherally arranged guide member, the drill having a center axis, the guide member comprising a part-cylindrical first surface portion and an eccentric second surface portion, the first surface portion connecting axially rearwardly along the guide member to the second surface portion, wherein a first surface portion situated closest to the cutting edge has a circumferential extension coinciding with an imaginary cylinder, which is concentric with the center axis, and the second surface portion is eccentric relative to the center axis, wherein the first surface portion lacks a clearance angle and the second surface portion forms a clearance angle.

5. The drill according to claim 4, wherein the first surface portion is shorter in the axial direction than the second surface portion.

6. A drill for, with respect to a work piece, rotary chip removing machining, comprising a drill body, a drill tip, and a shank portion, the drill tip comprising at least one cutting edge and at least one peripherally arranged guide member, the drill having a center axis, the guide member comprising a part-cylindrical first surface portion and an eccentric second surface portion, the first surface portion connecting axially rearwardly along the guide member to the second surface portion, wherein a first surface portion situated closest to the cutting edge has a circumferential extension coinciding with an imaginary cylinder, which is concentric with the center axis, and wherein the first surface portion lacks a clearance angle and the second surface portion forms a clearance angle.

7. The drill according to claim 2, wherein the first surface portion is shorter in the axial direction than the second surface portion.

8. The drill according to claim 1, wherein the second surface portion is eccentric relative to the center axis.

9. A drill for, with respect to a work piece, rotary chip removing machining, comprising a drill body, a drill tip, and a shank portion, the drill tip comprising at least one cutting edge and at least one peripherally arranged guide member, the drill having a center axis, the guide member comprising a part-cylindrical first surface portion and an eccentric second surface portion, the first surface portion connecting axially rearwardly along the guide member to the second surface portion, and wherein the first surface portion lacks a clearance angle and in that the second surface portion forms a clearance angle.

10. The drill according to claim 1, wherein the first surface portion is shorter in an axial direction than the second surface portion.

11. The drill according to claim 10, wherein the first surface portion is less than half of the axial length of the second surface portion.

12. The drill according to claim 11, wherein the first surface portion is 0.1 to 0.5 times the axial length of the second surface portion.

13. Drill tip for a drill for rotary chip removing machining, comprising at least one cutting edge, and at least one guide member, the drill tip having a center axis, the guide member comprising a part-cylindrical first surface portion, an eccentric second surface portion, and a part-cylindrical third surface portion, the first surface portion connecting axially rearwardly along the guide member to the second surface portion and the third surface portion connecting forwardly to the second surface portion in a direction of rotation of the drill tip, the drill tip comprising a support surface for removably securing the drill tip to the drill body.

14. The drill tip according to claim 13, wherein a first surface portion situated closest to the cutting edge has a circumferential extension coinciding with an imaginary cylinder, which is concentric with the center axis.

15. The drill tip according to claim 14, wherein the second surface portion is eccentric relative to the center axis.

16. Drill tip for a drill for rotary chip removing machining, comprising at least one cutting edge, and at least one guide member, the drill tip having a center axis, the guide member comprising a part-cylindrical first surface portion and an eccentric second surface portion, the first surface portion connecting axially rearwardly along the guide member to the second surface portion, wherein a first surface portion situated closest to the cutting edge has a circumferential extension coinciding with an imaginary cylinder, which is concentric with the center axis, wherein the second surface portion is eccentric relative to the center axis, and wherein the first surface portion lacks clearance angle and in that the second surface portion forms a clearance angle.

17. The drill tip according to claim 16, wherein the first surface portion is shorter in an axial direction than the second surface portion.

18. The drill tip according to claim 13, wherein the second surface portion is eccentric relative to the center axis.

19. Drill tip for a drill for rotary chip removing machining, comprising at least one cutting edge, and at least one guide member, the drill tip having a center axis, the guide member comprising a part-cylindrical first surface portion and an eccentric second surface portion, the first surface portion connecting axially rearwardly along the guide member to the second surface portion, and wherein the first surface portion lacks clearance angle and in that the second surface portion forms a clearance angle.

20. The drill tip according to claim 13, wherein the first surface portion is shorter in an axial direction than the second surface portion.

* * * * *